March 7, 1961     G. M. PRO     2,973,855
AUGER ASSEMBLY HAVING NOVEL DISCHARGE END
Filed Sept. 15, 1958
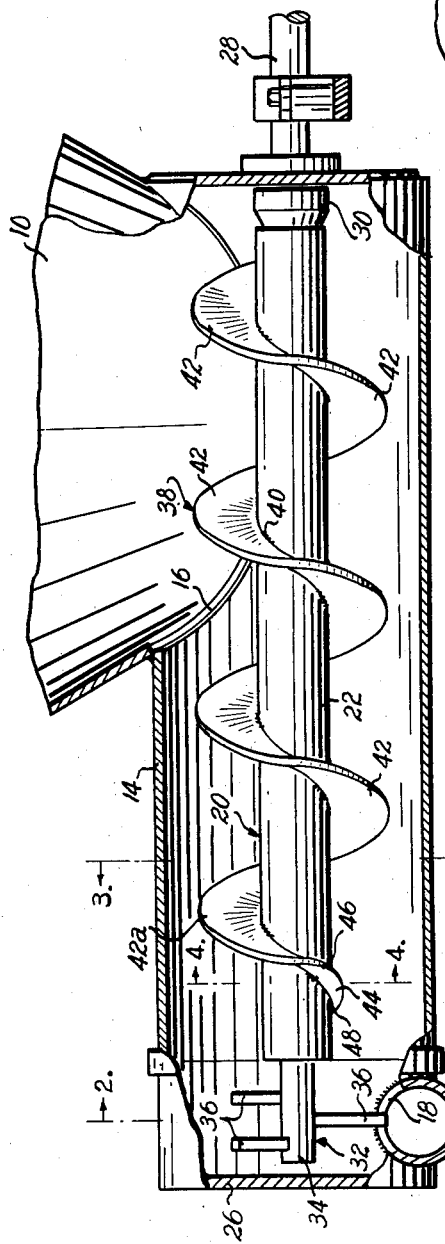
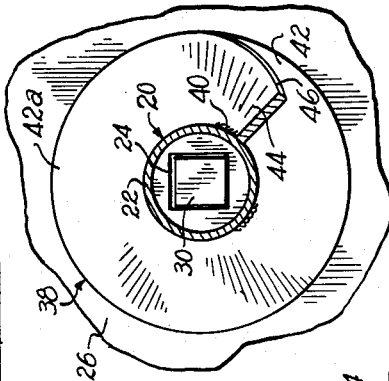
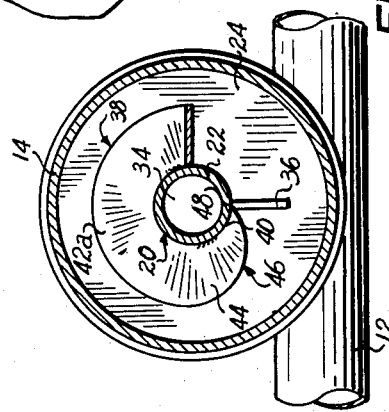
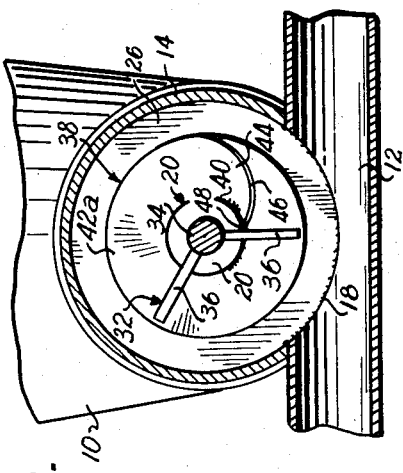
INVENTOR.
George M. Pro
BY
ATTORNEY.

United States Patent Office 2,973,855
Patented Mar. 7, 1961

2,973,855
AUGER ASSEMBLY HAVING NOVEL DISCHARGE END

George M. Pro, Leawood, Kans., assignor to Air Placement Equipment Company, Kansas City, Mo., a corporation of Missouri Filed Sept. 15, 1958, Ser. No. 760,892
1 Claim. (Cl. 198—213)

This invention relates to apparatus for handling cementitious materials and more particularly, wet or dry concrete and has for its primary object the provision of structure that will effectively and properly convey such materials from a mixing hopper therefor to a point of use of placement.

Those skilled in this field are aware of the fact that the handling of concrete presents difficult problems, particularly with respect to conveying or moving the same through use of mechanized equipment. Such materials do not flow easily and uniformly, and it is most difficult to force the same along a desired path of travel. While various types of conveyors, elevators and other devices have been tried, continuous and uniform advancement of concrete, especially from a mixing hopper to a point of use, has not been altogether successful. I have discovered however, that a conveyor in the nature of a floating screw in a tube or cylinder can be effectively and advantageously employed if the screw thereof is made in a particular manner, and in order to accomplish the desired results, I have found it necessary to provide a special convolution in the spiral blade of the screw at the discharge end of the tube.

It is accordingly, the primary object of the present invention to provide a conveyor for the aforementioned purpose that has a terminal convolution of reduced diameter, and more particularly, one that progressively and uniformly reduces in diameter as it approaches and merges with a core forming a part of the screw and about which the blade is spirally wound.

In conjunction with the above, it is an important object of the present invention to provide a special assembly for handling the concrete at the discharge end of the cylinder and cooperating with the said specially formed convolution so as to continually and uniformly feed the material into an air pipe.

Other objects include the way in which the outlet pipe partially intersects the conveyor tube and communicates therewith in tangential relationship thereto; the manner of providing a paddle wheel within the conveyor cylinder at its discharge end directly above the outlet pipe; the manner of attachment of the paddle wheel to the core of the screw for rotation therewith and in axial relationship to such core at the aforementioned specially formed convolution; and other important details of construction to be made clear as the following specification progresses.

In the drawing:

Fig. 1 is a side elevational view partially broken away and partially in section showing the conveyor system of the instant invention in conjunction with a hopper that is illustrated fragmentarily; and Figs. 2, 3 and 4 are fragmentary, cross-sectional views taken on lines 2—2, 3—3 and 4—4 of Fig. 1.

The conveyor structure illustrated in the drawing is adapted for use as a part of a cement gunning machine in the nature of that shown and described in my co-pending application Serial No. 492,397, filed March 7, 1955. It is but necessary to point out that in a machine of such character, there is provided a hopper 10 for concrete, and the conveyor structure herein illustrated is provided to advance such material from the hopper 10 to an outlet pipe 12 for ultimate use or placement at a point remote from the hopper 10. To this end, therefore, there is provided a conveyor that includes an elongated tube 14, preferably in the nature of a cylinder and having its elongated axis disposed horizontally. Cylinder 14 underlies the hopper 10 at the materials inlet end of cylinder 14, communicating with hopper 10 through opening 16.

The pipe 12 on the other hand, is disposed at the discharge end of the cylinder 14 therebeneath and partially intersects the latter in much the same manner as cylinder 14 meets with the lower end of hopper 10. Thus, pipe 12 is disposed at a tangent to the cylinder 14 and communicates therewith via materials outlet opening 18.

As disclosed in my copending application aforementioned, compressed air is directed through the pipe 12 for advancing the materials therethrough to a point of use or for high velocity placement of the materials on any surface to be coated therewith.

The conveyor structure includes a floating screw 20 within the cylinder 14, having an elongated core 22 which may be cylindrical as shown, if desired. A drive shaft 28 for rotating screw 20, connects with one end of core 22 through a special coupling 30 that extends into core 22. While screw 20 is shown with its axis coaxial with cylinder 14, there is sufficient looseness of fit between polygonal socket 24 of core 22 and coupling 30 to permit screw 20 to rise and fall.

A paddle wheel 32 at the discharge end of the cylinder 14 and directly above the pipe 12, has a stub shaft 34 fixed directly to the proximal end of the core 22 for rotation therewith about the same axis of rotation. Each of a plurality of radially disposed paddles 36 secured to shaft 34 is of sufficient length to extend into the pipe 12 as illustrated. Screw 20 remains attached to coupling when not in use by virtue of shaft 34 abutting end wall 26 of cylinder 14.

Screw 20 includes additionally, a continuous blade 38 coiled spirally about the core 22 from end-to-end thereof and fixed rigidly to the core 22 as by welding at 40, throughout the length of the innermost edge of blade 38. There is presented, therefore, a plurality of convolutions 42 in the spiral blade 38 that are of equal diameter, but such diameter of the plurality of convolutions 42 is appreciably less than the inside diameter of the tube or cylinder 14.

At the discharge end of the cylinder 14, however, blade 38 is provided with a single convolution 44 that differs from the convolutions 42 in that it is provided with a reduced diameter. The terminal convolution 44 has an arcuate, spiral edge 46 as in the convolutions 42, but the convolution 44 progressively decreases in diameter as the discharge end of the cylinder 14 is approached, until such diameter reduces to zero as the convolution 44 merges at the terminus 48 thereof, with the core 22. By noting the shape of the arcuate spiral edge 46 of convolution 44, especially in Figs. 2–4 of the drawing, it is seen that the reduction in the diameter of convolution 44 is gradual, progressive and uniform, from the point of merger thereof with the next adjacent convolution 42a, to the point 48 of merger of convolution 44 with core 22.

The conveying structure above described is adapted for use in connection with many types of materials, as for example, wet or dry concrete. When attempt is made to accomplish the results through use of a conventional screw wherein the convolutions terminate abruptly at the end of the screw, the materials are discharged in nonuniform batches since the terminal convolution tends to momentarily impede free flow during each revolution. Also, the materials assume a predetermined angle of repose toward the discharge end of the tube 14 and the effect of conventional terminal convolutions is to adversely interrupt such angle of repose. In the instant invention on the other hand, the especially formed convolution 44 avoids not only interruption with the angle of repose of the materials, but avoids any interruption in the free and continuous uniform flow of the material for gravitation into the discharge 212. The paddles 36 function particularly well in the case of wet concrete, tending to break the same up and prevent any tendency to clog as such materials gravitate from the cylinder 14 into the tube 12.

The free floating principle of the screw 20 permits the same to rise over large pieces of aggregate such as rock, and while, during nonuse, the screw 20 rests on the bottom of the cylinder 14, screw 20 assumes substantially the position shown in Fig. 1 during use and the force of the materials tends to hold the screw 20 biased toward the coupling 30.

The arrangement is particularly advantageous when used in connection with placement of concrete through use of discharge nozzles wherein the moisture content is added at the nozzle. In such uses, it is advantageous, if not essential, that the materials be fed to the tube 12 and, therefore, to the nozzle at a uniform rate and continuously in absence of problems incident to feeding in nonuniform lumps or batches.

Having thus described the invention what is claimed as new and desired to be secured by Letters Patent is:

A conveyor unit for cementitious materials comprising an elongated, normally horizontally disposed cylinder provided with a materials inlet opening in the top thereof adjacent one end of same, and a materials outlet at the opposite end thereof, said one end of the cylinder having a transversely extending end wall closing the same; a drive shaft extending through said end wall in axial alignment with said cylinder and provided with a coupling on the inner end thereof within said cylinder, the innermost extremity of said coupling being transversely polygonal; a rotatable member extending substantially the full length of the cylinder, disposed in spaced, axial relationship thereto, and having an elongated core provided with a polygonal socket at one end thereof, proximal to said end wall, complementally and loosely receiving said coupling to permit free swinging movement of said member within the cylinder, there being a continuous blade fixed to said core and coiled spirally thereabout from end to end thereof, defining a plurality of convolutions of equal diameter and a terminal convolution of lesser diameter adjacent said opposite end of the cylinder, said terminal convolution gradually, progressively and uniformly decreasing in diameter as said opposite end of the cylinder is approached until its diameter reduces to zero as the same merges at the terminus thereof with said core, said terminus of the blade being in spaced relationship to said opposite end of the cylinder; a pipe for receiving said materials connected to and communicating with the cylinder in underlying, partial, intersecting relationship thereto; and a paddle wheel in said cylinder at its said opposite end above the pipe secured to the opposite end of the core in axial alignment with the latter for rotation therewith and spaced from said terminus of the blade whereby cementitious material delivered into the cylinder through said inlet is transferred longitudinally of the cylinder by said blade during rotation of the member and finally delivered to said pipe, and whereby movement of the member prevents compacted cementitious material from damaging the screw during conveyance through the cylinder, as the paddle wheel precludes bridging of materials across said pipe.

References Cited in the file of this patent

UNITED STATES PATENTS

| | | |
|---|---|---|
| 1,690,789 | Lower et al. | Nov. 6, 1928 |
| 2,449,240 | Martin | Sept. 14, 1948 |
| 2,663,405 | Messing | Dec. 22, 1953 |